(No Model.)
A. W. MILLER, W. BOWER & A. W. COLEMAN.
APPARATUS FOR BLEACHING FRUIT.
No. 321,741. Patented July 7, 1885.
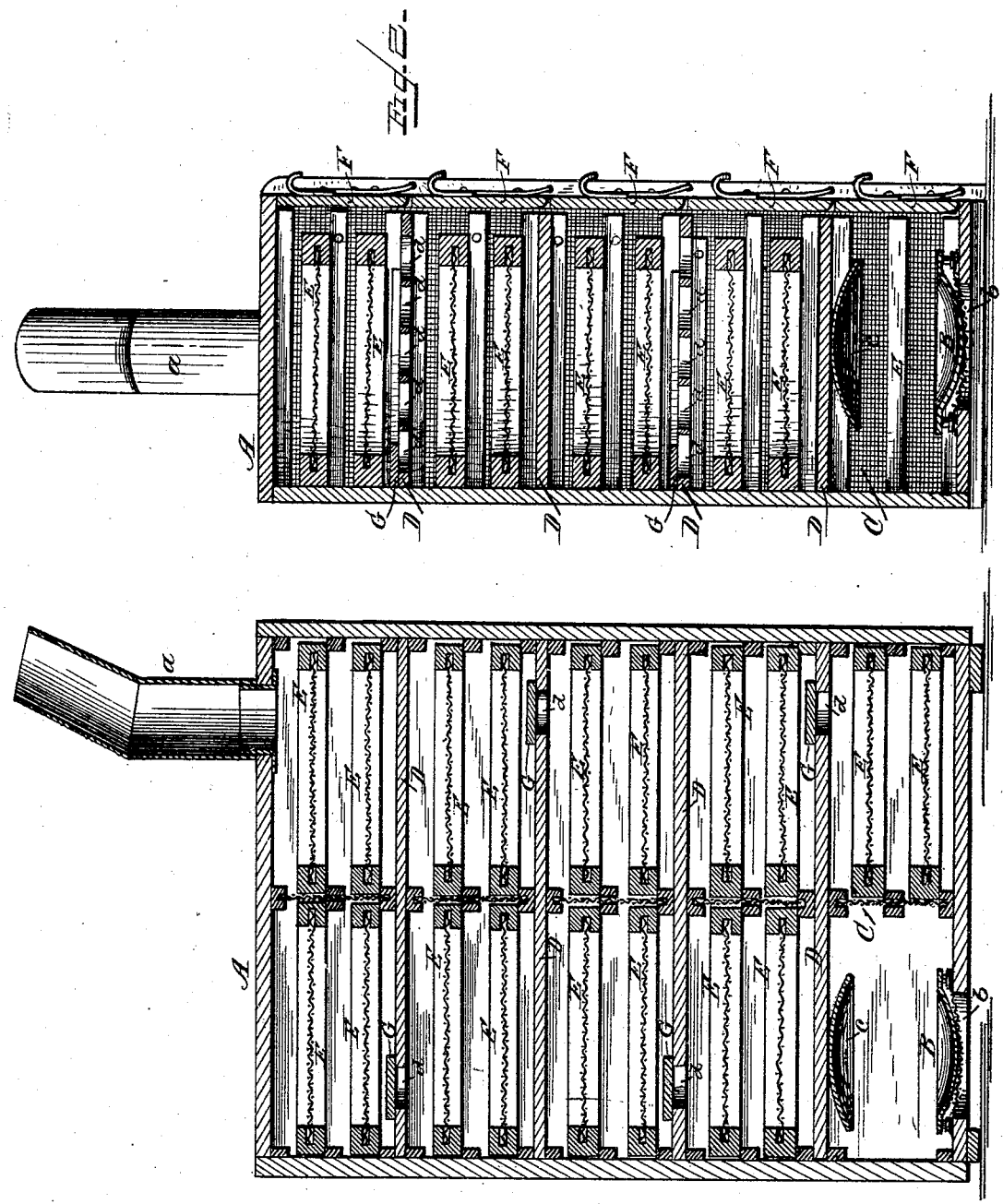

UNITED STATES PATENT OFFICE.

AARON W. MILLER, WILLIAM BOWER, AND ABNER W. COLEMAN, OF NEWARK, NEW JERSEY.

APPARATUS FOR BLEACHING FRUIT.

SPECIFICATION forming part of Letters Patent No. 321,741, dated July 7, 1885.

Application filed August 8, 1884. (No model.)

*To all whom it may concern:*

Be it known that we, AARON W. MILLER, WILLIAM BOWER, and ABNER W. COLEMAN, citizens of the United States, residing at Newark, in the county of Essex and State of New Jersey, have invented certain new and useful Improvements in Bleaching Apparatus for Fruits, &c.; and we do hereby declare that the following is a full, clear, and exact description of the same, reference being had to the annexed drawings, making a part of this specification, and to the letters and figures of reference marked thereon.

Figure 1 of the drawings is a longitudinal vertical section of a fruit-bleaching apparatus constructed in accordance with our invention, and Fig. 2 a transverse section thereof.

The present invention has relation to certain new and useful improvements in apparatus for bleaching fruit; and it consists in the several details of construction, substantially as shown in the drawings, and hereinafter described and claimed.

In the accompanying drawings, A represents a suitable casing of any desirable size and shape, provided at its top with an escape-pipe, $a$, and at its bottom with an opening, $b$, covered with perforated sheet metal or wire-gauze to keep out insects. Over the opening $b$ is placed a suitable pan, B, for containing the burning sulphur or other material used for bleaching, a shield, $c$, being suspended above it, so as to remove the rising heat from direct contact with the lower partition.

The casing A is divided into two compartments by a vertical wall, C, extending from top to bottom of said casing, and is made either perforated of wood, sheet metal, or other material, or of wire-gauze, as shown, the object being to allow the fumes of the sulphur to freely pass through the wall from one compartment to the other in its ascent. The vertical compartments are each divided into a series of horizontal or sub compartments by horizontal partitions D, extending from side to side of the casing and supported by cleats or other well-known means. Each of these sub-compartments contains a suitable number of trays, E, provided with a perforated or wire-gauze bottom, for containing the fruit to be bleached, said trays being removable and resting on cleats secured to the sides of the casing and wall C.

The casing A is provided with a series of doors, F, extending across the entire width thereof, and so arranged with relation to the sub-compartments that one of said doors will serve the purpose of closing the two compartments which are on the same horizontal plane. It is evident, however, that each one of the sub-compartments may have a separate door, if so preferred.

The partitions D are shown as continuous, to form the bottoms and tops of the two sub-compartments on the same horizontal plane; but, if preferred, each of the compartments may have a separate top and bottom from the one next beside it. In the latter case every alternate partition is provided with one or more perforations or openings, $d$, controlled by a valve, G; but when the partitions D are made continuous to extend across the entire width of the casing A, as shown in Fig. 1, each one of said partitions is provided with an opening and valve, and located with relation to each other so that by closing one of the valves the rising fumes of the burning sulphur in the pan B will be shut off from all the sub-compartments above it.

By the employment of the valves and openings in the partitions, when it is desired to remove any of the trays or examine the condition of the fruit thereon, which necessitates opening one of the doors F, the fumes of sulphur are prevented from further ascending into the compartment to which access is had by closing the valve in the partition forming the bottom thereof, thus not only rendering the examination and removal of the fruit less objectionable, but preventing the fumes of the sulphur from escaping into the room.

Although a single wall, C, is employed to divide the casing in two vertical rows of compartments, two or more walls may be used, and any suitable number of rows of compartments, as found desirable, these changes coming within the scope of our invention.

Having now fully described our invention, what we claim as new, and desire to secure by Letters Patent, is—

The herein-described apparatus for bleaching fruit, consisting of the following elements in combination: the case A, vertical perforated partition C, horizontal partitions D, provided with openings at opposite ends, for the purposes described, valves G, to close or disclose said openings, the pan B, and shield c, all arranged and operating substantially as shown, and for the purposes described.

In testimony that we claim the above we have hereunto subscribed our names in the presence of two witnesses.

AARON W. MILLER.
WILLIAM BOWER.
ABNER W. COLEMAN.

Witnesses:
E. De L. Bradin.
T. A. Collins.